United States Patent [19]

Golladay

[11] Patent Number: 4,634,949
[45] Date of Patent: Jan. 6, 1987

[54] CONTROL DEVICES FOR USE WITH A STEPPING MOTOR

[75] Inventor: Harvey L. Golladay, Beaverton, Oreg.

[73] Assignee: Tektronix, Inc., Beaverton, Oreg.

[21] Appl. No.: 709,268

[22] Filed: Mar. 7, 1985

[51] Int. Cl.$^4$ ............................................. H02P 8/00
[52] U.S. Cl. .................................. 318/696; 318/685; 364/814
[58] Field of Search ............... 318/685, 696; 364/807, 364/808, 814

[56] References Cited

U.S. PATENT DOCUMENTS 3,870,871  3/1975  Nead .................................. 364/818

*Primary Examiner*—William M. Shoop, Jr.
*Assistant Examiner*—Saul M. Bergmann
*Attorney, Agent, or Firm*—William S. Lovell; John D. Winkelman; John Smith-Hill

[57] ABSTRACT

A stepping motor generates first and second voltages each varying in accordance with a sinusoidal function having a period proportional to the period of rotation of the motor's rotor, the first and second voltages being in quadrature with each other. A control device generates from the first and second voltages a signal representative of a number that is proportional to the square root of the sum of the squares of the first and second voltages. This signal is used to modify the energizing current provided to the phase windings of the stator, in order to reduce fluctuations in torque and shaft angular velocity.

12 Claims, 3 Drawing Figures

CONTROL DEVICES FOR USE WITH A STEPPING MOTOR

This invention relates to control devices for use with a stepping motor.

BACKGROUND OF THE INVENTION

A known X-Y plotter, such as the Tektronix 4662 or 4663, functions by driving its pen head along vectors (straight lines between defined end points) within the plotter work space. The plotter has an X motor which drives the pen head in the X direction and a Y motor which drives the pen head in the (orthogonal) Y direction. The plotter has a microprocessor which receives information relating to the end points and uses that information, as well as information relating to the characteristics of the motors and the drive trains between the motors and the pen head, to calculate acceleration, constant velocity and deceleration times necessary to cause the pen head to travel along the vector between the end points. Clearly, the acceleration, constant velocity and deceleration times for the X and Y motors must be equal, and the instantaneous magnitudes of the speed and of the rates of change of speed of the motors must remain in proportion to one another, in order for the lines that are executed by the pen head to be straight.

In the Tektronix 4662 and 4663 digital X-Y plotters, stepping motors driven in a microstepping mode of operation are used for the X and Y motors because this enables the motors to be driven between precisely defined end points.

A conventional permanent magnet stepping motor is described in Theory and Application of Step Motors, Kuo, 1974, at pages 25–30. The rotor of that motor comprises a cylindrical permanent magnet core mounted coaxially on the rotor shaft and magnetized parallel to the axis of the shaft, and two soft iron caps which are fitted on the core at opposite ends thereof. Each cap is of generally cylindrical form and the caps have an equal number of equiangularly spaced teeth formed about their peripheries. The two sets of teeth are relatively angularly displaced about the axis of the rotor shaft by an angle equal to half the angular pitch between adjacent teeth of one cap. The core and the caps thus establish a number of pole pairs equal to the number of teeth of each cap. Typically, each cap has fifty teeth and so the rotor has fifty magnetic pole pairs. The two rotor caps may be designated N and S, in accordance with the polarity of the magnetization induced by the core. The stator is constructed of a stack of laminations that define eight salient poles. The salient poles are equiangularly spaced about the rotor axis, and for the sake of convenience in the following description the poles are designated by number according to their angular positions relative to a selected salient pole: the selected pole (pole 1) is at 0 degrees, pole 2 is at 45 degrees, pole 3 at 90 degrees, etc. Each salient pole is formed with five teeth that are presented towards the rotor. The stator teeth are at a pitch of 7.5 degrees, but eight teeth are omitted to allow space for the windings. Each salient pole is in two parts, at the two ends respectively of the rotor, so that the teeth of the two parts are associated with the two rotor caps respectively. Unlike the teeth of the two rotor caps, the teeth of the two parts of each salient pole are not angularly displaced relative to each other.

The stator has two phase windings, which may be called windings A and B for the sake of convenience, and windings A and B are wound on alternate salient poles, i.e., winding A is wound on poles 1, 3, 5 and 7 while winding B is wound on poles 2, 4, 6 and 8. Poles 3 and 7 are wound in the opposite sense to poles 1 and 5, and similarly poles 2 and 6 are wound in the opposite sense to poles 4 and 8. Thus, if the phase winding A is energized so that pole 1 is magnetized as a north pole, pole 5 is also magnetized as a north pole and poles 3 and 7 are magnetized as south poles. Only one phase winding is energized at a time, and the sequence of energization may be represented by 1,0; 0,1; −1,0; 0,−1; 1,0, etc., where the first digit of each pair indicates the state of magnetization of pole 1 and the second digit the state of magnetization of pole 2; and 1 indicates that the particular pole is magnetized as a north pole, −1 indicates that it is magnetized as a south pole and 0 indicates that it is not magnetized.

The rotor always attempts to assume a rotational position relative to the stator such that the sum of the reluctances of the magnetic circuits containing the rotor and magnetized poles of the stator is at a minimum, and this requires that the center teeth of poles that are magnetized as north poles be aligned with rotor teeth of the cap S and be out of alignment with rotor teeth of the cap N. Thus, in the state 1,0 the magnetic circuits defined by the poles 1, 3, 5 and 7 and the rotor have a minimum reluctance if the center teeth of poles 1 and 5 are aligned with respective teeth of the rotor cap S, and the center teeth of the rotor cap N. When the center teeth of poles 1 and 5 are aligned with teeth of the rotor cap S, the center teeth of poles 2 and 6 are one-quarter of a rotor pitch (1.8 degrees) out of alignment with teeth of the same rotor cap, and so when the state of magnetization changes to 0,1 the rotor advances through an angle of 1.8 degrees. In this position, the center teeth of poles 3 and 7 are one-quarter of a rotor pitch out of alignment with teeth of the cap S, so that when the state of energization is changed to −1,0 the rotor advances by another 1.8 degrees. Accordingly, if the phase windings are energized in accordance with the above sequence, the rotor will advance in steps of 1.8 degrees and by appropriate control of the energization of the phase windings, the rotor can be caused to stop at any one of the 200 angular positions corresponding to the steps of 1.8 degrees. In general, the rotor executes 4N steps per cycle, where N is the number of rotor pole pairs, and may be caused to stop at any one of these positions. This mode of operation of a stepping motor may be referred to as regular stepping, or simply as stepping, in order to distinguish it from microstepping, described below.

In the microstepping mode of operation of a stepping motor, the possibility exists of both stator windings being energized. If the relationship between the energizing currents $I_A$ and $I_B$ for the two windings is $$I_A = I \sin \theta_e \quad (1)$$

$$I_B = I \cos \theta_e \quad (2)$$

where I is a constant and $\theta_e$ has the dimensions of radians, the rotor interpolates between adjacent pairs of the above mentioned 4N possible positions in accordance with the value of $\theta_e$. When equations (1) and (2) apply, the vector sum $I_T$ of the two currents is given by $$I_T = \sqrt{2} \, I \cos(\theta_e - \pi/4) \tag{3}$$

If the currents can be controlled so that $\theta_e$ has M discrete values between 0 and $\pi/4$ radians, the total number of possible rotational positions that can be assumed by the rotor, and therefore the number of steps per revolution of the rotor, is 4MN. Typically, N is 50 and M is 32, and so the number of microsteps per revolution is 6,400.

A microstepped stepping motor is particularly suited for driving the pen head of a plotter, since by accurate control of the energizing currents of the windings of the motor the pen head may be driven rapidly across its work area and stopped at a predetermined position, corresponding to one of the permitted rotational positions of the rotor. During translation of the pen head, the windings of each motor are driven by sinusoidally varying currents in phase quadrature relationship.

The torque required, $T_R$, of a stepping motor to accelerate a mechanical load is given by:

$$T_R = \frac{\theta}{|\theta|} C + \omega B + \alpha J \tag{4}$$

where $\theta$ is the angular position of the motor shaft relative to a radius which is fixed with respect to the stator, C is the combined motor plus reflected mechanism coulomb friction constant, $\omega$ is the motor shaft angular velocity (d $\theta$/dt or $\dot{\theta}$), B is the combined motor plus reflected mechanism viscous friction contant, $\alpha$ is the motor shaft angular acceleration ($d^2\theta/dt^2$, or $\ddot{\theta}$) and J is the combined motor plus reflected mechanism inertia constant.

The torque available, $T_A$, from the stepping motor can be expressed to first order as:

$$T_A = K_T I_T \sin(\theta_e - \theta_m) \tag{5}$$

where $\theta_m$ has the dimensions of radians, and represents the angular position of the rotor measured in the space such that the interval between two adjacent steps (as opposed to microsteps) of the rotor is $\pi/4$ radians. Thus, for each revolution of the rotor $\theta_m$ changes by $2N\pi$, and if $\theta_m$ is equal to zero when $\theta$ is equal to zero then $$\theta_m = N\theta \tag{6}$$

Setting equation (4) equal to equation (5) and substituting for $\theta$ from equation (6) gives $$\frac{1}{N}\left(\frac{\theta_m}{|\theta_m|} C + \dot{\theta}_m B + \ddot{\theta}_m J\right) = K_T I_T \sin(\theta_e - \theta_m) \tag{7}$$

$\theta_e$ and $\theta_m$ can be considered as the angular position of electrical and mechanical phasors, representing respectively the angular position of the induced magnetic pole pair set up by magnetic flux in the stator poles resulting from currents in the phase windings and the angular position of one of the magnetic poles pairs of the rotor, each angle being measured in the space such that $2\pi$ radians correspond to $2\pi/N$ geometrical radians.

For proper stepping motor action, the angular difference $\theta_e - \theta_m$ between the phasors must be kept small, and therefore $$\sin(\theta_e - \theta_m) = (\theta_e - \theta_m) \tag{8}$$

Neglecting the coulomb friction component, which is significant only at low angular velocities, and substituting for $\sin(\theta_e - \theta_m)$ from equation (8), equation (7) becomes $$\frac{1}{N}(\dot{\theta}_m B + \ddot{\theta}_m J) = K_T I_T (\theta_e - \theta_m) \tag{9}$$

Laplace transforms can be used to obtain a system transfer function:

$$\theta_m(s)/\theta_e(s) = NK_T I_T/(Js^2 + Bs + NK_T I_T) \tag{10}$$

Equation (10) can be put in the following form:

$$\theta_m(s)/\theta_e(s) = \omega_n^2/(s^2 + 2\zeta\omega_n s + \omega_n^2) \tag{11}$$

where:

$$\omega_n = \sqrt{(NK_T I_T/J)} \tag{12}$$

$$\zeta = B/(2\omega_n J) \tag{13}$$

$\omega_n$ and $\zeta$ being, respectively, the natural resonance frequency and the damping ratio of the system.

Solving the system characteristic equation (the denominator of equation (11)) for its roots gives:

$$s_1, s_2 = -\zeta\omega_n \pm j\omega_n \sqrt{(1 - \zeta^2)} \tag{14}$$

For stepping motor systems with low viscous friction forces, such as digital x-y plotters, $\zeta$ will be on the order of 0.3. It can be shown that if $\zeta$ is less than 1.0, the motor-mechanism combination is susceptible to angular position perturbations if $\omega(=\dot{\theta})$ is close to or equal to $\omega_n$. This is due to small amounts of torque variations being present in the torque output of the motor and the motor drive system. These torque variations are the result of non-ideal behavior of the motor and motor drive and are harmonically related to shaft angular velocity. It is to be expected that any torque variations produced by the stepping motor or motor drive occurring at or close to the system natural frequency would degrade plotter line quality. In addition, if the motor is excited with a step function input, the motor-mechanism combination will be susceptible to angular positional overshoot. Those problems of improper response may be overcome or at least ameliorated by increasing the viscous friction constant B and thereby increasing the damping ratio $\zeta$. However, if the viscous friction constant is increased, the system suffers an increase in the torque lost due to viscous friction $\omega B$.

SUMMARY OF THE INVENTION

According to a first aspect of the present invention there is provided a control device for use with a stepping motor comprising a stator having phase winding means for generating a magnetic field which has a direction that can be varied with time in dependence on the current provided to the winding means for energization thereof, a rotor having a plurality of alternating north and south magnetic poles about a peripheral region thereof, said poles being substantially equiangularly spaced about the axis of the rotor, and sense coil means associated with the stator for generating first and second electrical voltages each varying in accordance with a sinusoidal function having a period proportional to the period of rotation of the rotor, the first and second voltages being in quadrature with each other, said control device comprising means for generating from said first and second voltages a signal representative of a number that is proportional to the square root of the sum of the squares of the first and second voltages, and means for utilizing said signal to modify the energizing current provided to the phase winding means.

According to a second aspect of the present invention there is provided a control device for use with a stepping motor comprising a stator having phase winding means for generating a magnetic field which has a direction that can be varied with time in dependence on the current provided to the winding means for energization thereof, and a rotor having a plurality of alternating north and south magnetic poles about a peripheral region thereof, said poles being substantially equiangularly spaced about the axis of the rotor, said control device comprising means for generating first and second electrical voltages each varying in accordance with a sinusoidal function having a period proportional to the period of rotation of the rotor, the first and second voltages being in phase quadrature with each other, means for generating from said first and second voltages a signal representative of a number that is proportional to the square root of the sum of the squares of the first and second voltages, and means for utilizing said signal to modify the energizing current provided to the phase winding means.

According to a third aspect of the present invention there is provided a stepping motor comprising a stator having phase winding means for generating a magnetic field which has a direction that can be varied with time in dependence on the current provided to the winding means for energization thereof, a rotor having a plurality of alternating north and south magnetic poles about a peripheral region thereof, said poles being substantially equiangularly spaced about the axis of the rotor, means for generating first and second electrical voltages each varying in accordance with a sinusoidal function having a period proportional to the period of rotation of the rotor, the first and second voltages being in quadrature with each other, and a control device for generating from said first and second voltages a signal representative of a number that is proportional to the square root of the sum of the squares of the first and second voltages, and means for utilizing said signal to modify the energizing current provided to the phase winding means.

It can be shown that the number represented by the signal generated from the first and second voltages is a measure of $\theta_m$. That signal can then be used to derive a correction factor K $(\dot{\theta}_e - \dot{\theta}_m)$, where K is a constant having the dimensions of time. By adding the correction factor to $\theta_e$, a desired value $\theta'_e$ for $\theta_e$ can be obtained, and equation (9) can then be rewritten as $$\frac{1}{N}(\theta_m B + \ddot{\theta}_m J) = K_T I_T\{[\theta_e - K(\dot{\theta}_e - \dot{\theta}_m)] - \theta_m\} \quad (15)$$

This is equivalent to detecting the angular velocity of the rotor pole pairs $(\dot{\theta}_m)$, subtracting the measured value of $\dot{\theta}_m$ from the desired angular velocity of the induced stator pole pairs $(\dot{\theta}_e)$ and using the difference information $(\dot{\theta}_e - \dot{\theta}_m)$ to modify the actual angular position of the induced stator pole pairs $(\theta_e)$. The correction factor K $(\dot{\theta}_e - \dot{\theta}_m)$ is zero when the angular velocities are the same magnitude and direction, including when both angular velocities are zero, and $\theta'_e$ is then equal to $\theta_e$.

Laplace transforms can be used to obtain a new transfer function:

$$\theta_m(s)/\theta_e(s) = ((NK_T I_T[1+Ks])/J)/(s^2 + [B+NKK_T I_T]s/J + NK_T I_T/J) \quad (16)$$

which shows that the effective viscous friction constant has been increased by $NKK_T I_T$ without increasing the viscous friction loss or increasing the system inertia as would occur if a mechanical viscous damper had been used. Thus, by determining the actual angular position $(\theta_e)$ of the induced stator pole pairs, which depends on the values of the currents energizing the phase windings, and then using the velocity difference information $(\dot{\theta}_e - \dot{\theta}_m)$ to adjust the actual angular position until the velocity difference is zero, the difference $\theta_e - \theta_m$ between the electrical and mechanical phasors is kept constant. Accordingly, fluctuations in torque and shaft angular velocity are reduced.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
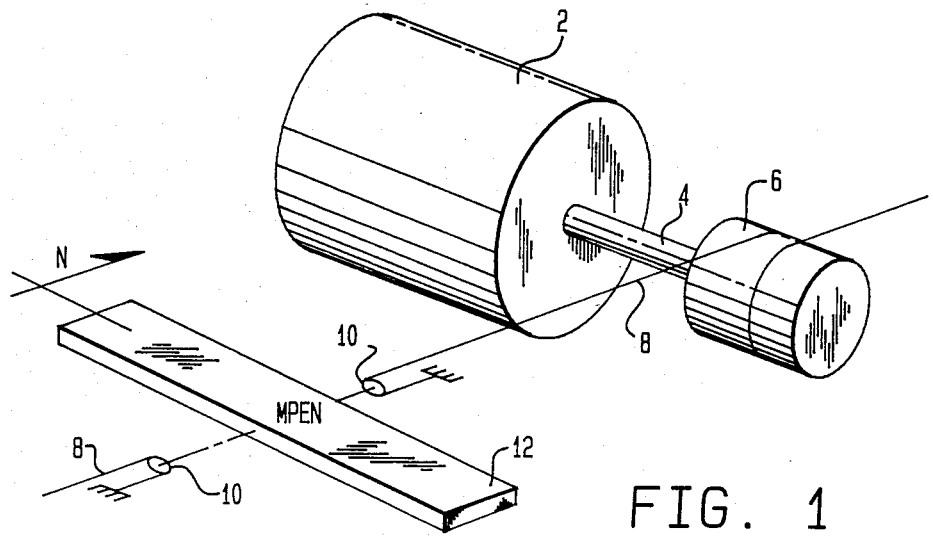
FIG. 1 illustrates schematically the mechanical arrangement of a stepping motor and a pen head connected thereto.

FIG. 1 illustrates the mechanical arrangement for driving the pen head of a digital x-y plotter in one direction (the x direction as illustrated). The motor 2 has a housing which is rigidly mounted in the plotter frame and has a rotary shaft 4 which projects from the housing. The shaft 4 is connected to a drive capstan 6. The two ends of a flexible, non-extensible cable 8 are secured to the plotter frame. The cable 8 is passed around pulleys 10 that are secured to the pen head 12. The cable is wound around the capstan and around stationary pulleys (not shown). Upon rotation of the capstan 6 in the clockwise direction, the pen head is driven in the x direction, and upon rotation of the capstan in the counterclockwise direction, the pen head is driven in the −x direction.

The following description of the invention is based upon an implentation of the invention in connection with a stepping motor having microstepping capabilities, manufactured by Portescap of La Chaux-de-Fonds, Switzerland and designated P752. This motor was described by C. Oudet at the Twelfth Annual Symposium on Incremental Motion Control Systems and Devices, which took place in May, 1983 at Champaign, Ill. under the auspices of the Incremental Motion Control Systems Society. The motor uses as its rotor a disk of samarium cobalt which is magnetized in one hundred pie-shaped domains each extending radially of the disk and lying in an annular region that is concentric with the disk. By total use of samarium cobalt as the material for the disc, instead of the iron and Alnico magnet that is conventionally employed for the rotor of a stepping motor, effects resulting from the ready magnetic saturation of conventional ferrous materials are ameliorated. The direction of magnetization is axial of the rotor, so that each domain has its north and south poles at opposite sides of the rotor, and adjacent domains are magnetized in opposite axial directions. The domains are uniformly distributed about the axis of the rotor.

In the P752 motor, each winding A, B (referred to subsequently as phase windings as distinct from sense windings) is split into two parts $A_1$, $A_2$ and $B_1$, $B_2$ which are disposed diametrically opposite each other for averaging purposes. The phase windings are provided with laminations which define an air gap within which the annular region of the disc is disposed. The flux generated by the phase windings is disposed axially of the rotor in the air gap.

In a practical implementation of the invention, as applied to a digital x-y plotter using units of the Portescap P752 motor for its x and y motors, a Motorola MC6809 microprocessor is used to calculate, for each direction (x and y), acceleration, constant velocity and deceleration magnitudes and times from vector end point data and from data relating to the characteristics of the motor. These calculations are performed by programming the MC6809 microprocessor in accordance with known techniques, for example as described in MC6809-MC6809E Microprocessor Programming Manual, published by Motorola Inc.; and result in the MC6809 providing a digital output signal representative of $s^2\theta_e(s)$, which in turn represents the instantaneous value of the angular acceleration of the electrical phasor. This signal is applied to a Motorola MC6801 microprocessor which is programmed in known manner (e.g. as described in MC6801 Micro-processor Programming Manual, published by Motorola Inc.) and uses the digital output signal to generate a digital signal representative of $\theta'_e(s)$, the desired value of the electrical phasor.

Figure 2:
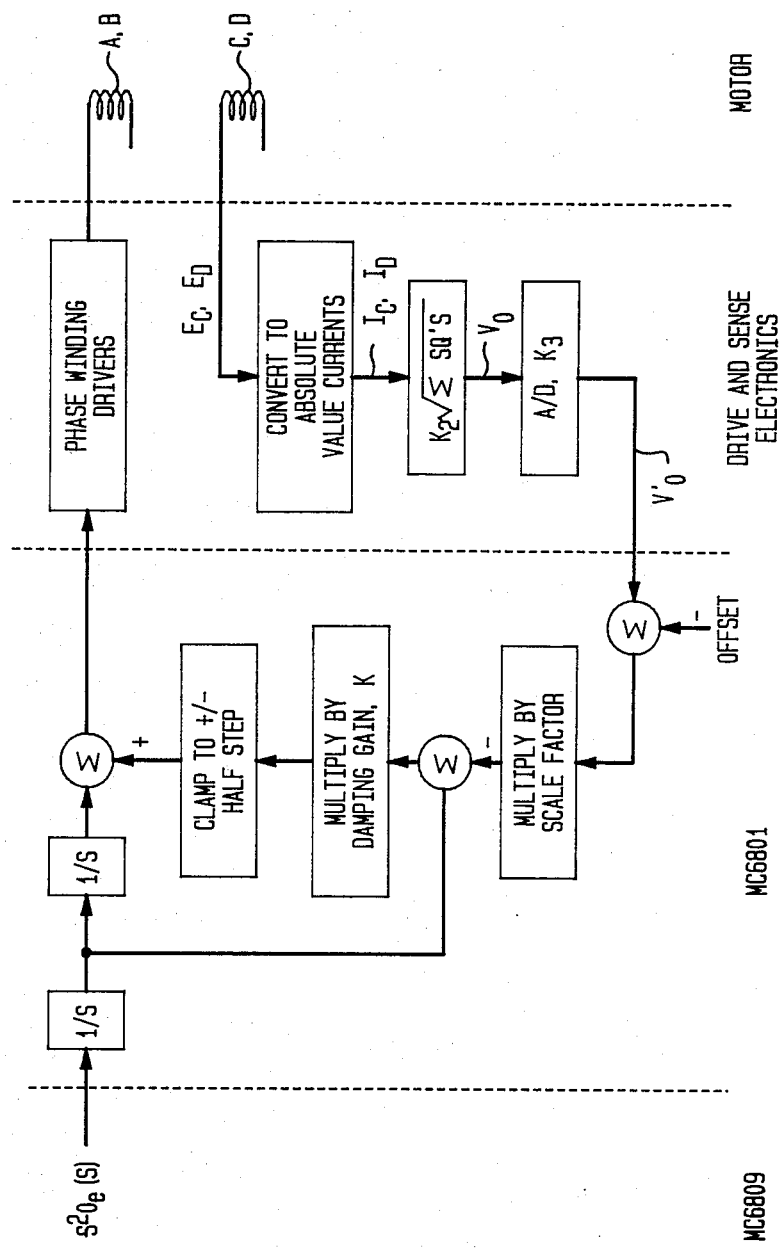
FIG. 2 is a block diagram illustrating operation of a control circuit for the Portescap P752 motor when used to drive a plotter pen head.

As shown in FIG. 2, the MC6801 first integrates $s^2\theta_e(s)$ in order to produce a signal representing $s\theta_e(s)$. This integration is accomplished using a constant time numerical integration algorithm whose parameters are controlled by the MC6809 micro-processor. A similar operation is used in controlling the Hewlett-Packard 9872A x-y plotter. The signal $s\theta_e(s)$ is again integrated, using the same techniques as before, to provide $\theta_e(s)$, and is also made available for a subtraction operation. The signal representative of $\theta_e(s)$ is adjusted by addition of a correction quantity $K[s\theta_e(s)-s\theta_m(s)]$, the derivation of which will be described below, to provide the signal representing $\theta'_e(s)$.

The digital signal representing $\theta'_e(s)$ is then converted to analog form and is used to drive the two phase windings of the motor. This may be accomplished in known manner, for example using a read only memory that performs a linear to sinusoidal transformation, a digital-to-analog converter, an analog multiplexer and H-bridge switching amplifiers. Through the motor-load combination, the value $\theta_e(s)$ is transformed into the value $\theta_m(s)$, which is a measure of the shaft angular position.

The stator of the P752 motor is also provided with two sense windings C and D. The sense windings are again each split into two parts $C_1$, $D_1$ and $C_2$, $D_2$ which are disposed diametrically opposite each other for averaging. Each sense winding is provided with flux concentrating laminations which define a magnetic circuit formed with two air gaps at opposite sides. The axial magnetic flux provided by the permanent magnet domains of the rotor, when the disc is disposed in the air gap defined by the flux concentrating laminations of the sense windings, varies in sinusoidal fashion about the annular region in accordance with the function $$\phi = \phi_{max} \sin(N\theta) \qquad (17)$$

where N is equal to half the number of domains, i.e., the number of pole pairs presented to one side of the disk, $\phi_{max}$ is a function of the magnetic circuit permeance and the magnetomotive force produced by the pole pairs and $\theta$ is the angular position about the rotor from a reference radius at which the axial magnetic flux is zero. The air gaps of each sense winding are disposed so that they are traversed sequentially by each pie shaped domain as the rotor rotates. Therefore, as the rotor rotates the laminations associated with each sense winding collect the flux from the magnetic domains passing through the air gap, and owing to the variation in flux due to rotation of the rotor a sinusoidally varying voltage is induced in the sense winding. Since there are N pole pairs, each revolution of the rotor is associated with N cycles of the sinusoidally varying voltages and therefore the frequencies of the voltages are both equal to $N\omega$, where $\omega$ is the angular velocity of rotation of the rotor. The phase difference between the voltages is $N\Omega$, where $\Omega$ is the angular offset of the sense windings. In the P752 motor, N is equal to 50 and $\Omega$ is 1.8 degrees, and therefore the two sinusoidally varying voltages are in quadrature and may be represented as $$E_C = K_1 \dot{\theta}_m(t) \cos\theta_m(t) \qquad (18)$$

$$E_D = K_1 \dot{\theta}_m(t) \sin\theta_m(t) \qquad (19)$$

where $K_1$ is a constant dependent on N, $\phi_{max}$ and the number of turns around the magnetic circuit.

Figure 3:
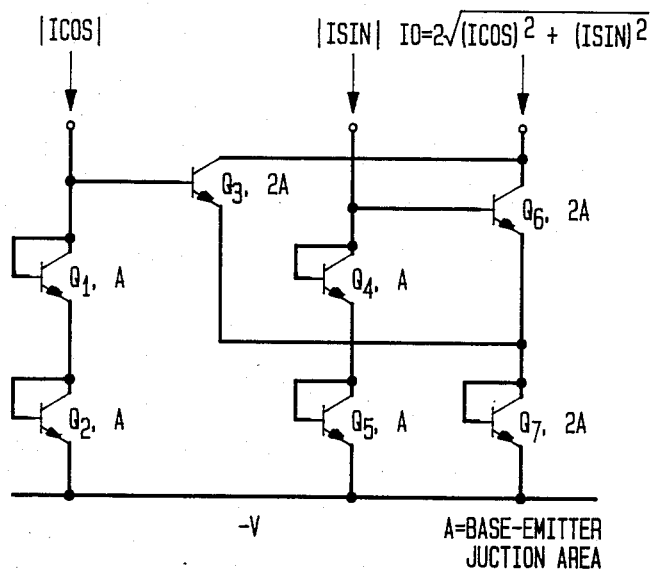
FIG. 3 illustrates schematically a portion of the control circuit.

The sense coil voltages $E_C$ and $E_D$ are converted to absolute value currents $I_C$ and $I_D$ by means of absolute value voltage amplifiers and transconductance circuits. The absolute value currents are then applied to a current mode circuit of the general kind described by R. W. J. Barker and B. L. Hart in "Root-Law Circuit Using Monolithic Bipolar-Transistor Arrays", *Electronic Letters*, Vol. 10, No. 21, Page 439 (October, 1974). The current mode circuit is illustrated in FIG. 3, where A represents the relative areas of the base-emitter junctions of the several transistors. Assuming that all the transistors of the FIG. 3 circuit are fabricated at the same time on the same die, so that $\alpha_F$ (the ratio of collector current to emitter current), $J_o$ (emitter-base junction reverse bias leakage current) and T (transistor temperature in degrees K.) are the same for all transistors, and that $\alpha_F$ is equal to unity and $V_{BE}$ is much larger than $kT/q$, where k is Boltzmann's constant and q is the charge on an electron, it can be shown that the output current $I_o$ is given by $$I_o = 2\sqrt{(I_C^2 + I_D^2)} \qquad (18)$$

The current $I_o$ is converted to a voltage $V_o$ by a transresistance connected amplifier, and it will be readily appreciated that $$V_o = K_1 K_2 s \theta_m(s) \tag{19}$$

where $K_2$ is a constant dependent upon the transfer functions of the transconductance circuits and of the transresistance connected amplifier. Thus, the voltage $V_o$ is proportional to the angular velocity $\omega$ of the rotor, i.e., $s\theta_m(s)/N$.

The analog voltage $V_o$ is converted to digital form by an analog-to-digital converter (ADC), and the digital output signal of the ADC is of the form $$V_o' = K_1 K_2 K_3 s \theta_m(s) \tag{20}$$

where $K_3$ is a constant that depends on the transfer function of the ADC. The digital signal $V_o'$ is applied to the MC6801 microprocessor, which uses the signal $V_o'$ to develop the correction signal for converting $\theta_e(s)$ to $\theta'_e(s)$.

During power up initialization of the plotter, the output of the ADC at zero motor velocity is measured and stored as an offset value, and the motor and mechanism are accelerated to terminal velocity and the output of the ADC is then measured and a normalization factor is calculated and stored. During subsequent operation of the plotter, the MC6801 subtracts the offset value from the output of the ADC and multiplies the corrected value of $V_o'$ by the normalization factor, and the resulting signal is of the form $s\theta_m(s)$. The signal $s\theta_m(s)$ is then subtracted from $s\theta_e(s)$, yielding $s\theta_e(s) - s\theta_m(s)$, and the latter signal is multiplied by the damping gain factor K to provide a signal of the form $K[s\theta_e(s) - s\theta_m(s)]$. This signal is clamped to a maximum value corresponding to a half-step (16 microsteps) difference between $\theta_e$ and $\theta_m$, since for proper stepping motor operation the difference between the electrical and mechanical phasors must not exceed the angle corresponding to half a step, and the clamped signal is added to $\theta_e(s)$ to provide the signal $\theta'_e(s)$.

In the foregoing discussions of the practical implementation of the invention, linear transforms are used. This is possible because of the high angular resolution of the stepping motor (32 microsteps per step) and because a high sampling rate (greater than ten times the system's natural frequency) is used.

It will be appreciated that the invention is not restricted to the specific motor and control device that have been described and illustrated, since variations may be made therein without departing from the scope of the invention as defined in the appended claims, and equivalents thereof. For example, the invention is not restricted to use in connection with a plotter pen head, and may be applied to other systems in which it is desired to bring about linear movement or an object.

I claim:

1. A control device for use with a stepping motor comprising a stator having phase winding means for generating a magnetic field which has a direction that can be varied with time in dependence on the current provided to the winding means for energization thereof, a rotor having a plurality of alternating north and south magnetic poles about a peripheral region thereof, said poles being substantially equiangularly spaced about the axis of the rotor, and sense coil means associated with the stator for generating first and second electrical voltages each varying in accordance with a sinusoidal function having a period proportional to the period of rotation of the rotor, the first and second voltages being in quadrature with each other, said control device comprising means for generating from said first and second voltages a signal representative of a number that is proportional to the square root of the sum of the squares of the first and second voltages, and means for utilizing said signal to modify the energizing current provided to the phase winding means.

2. A control device according to claim 1, wherein said means for generating said signal comprise means for generating first and second electrical currents proportional to the absolute values of the first and second voltages respectively, current mode means for forming a third current proportional to the sum of the squares of said first and second currents, and means for converting the third current into said signal.

3. A control device according to claim 2, wherein said signal is a digital signal and the means for converting the third current into said signal comprise means for converting the third current into a third voltage and an analog to digital converter for converting said third voltage into a digital signal representative of a number that is proportional to the value of the third voltage.

4. A control device according to claim 1, wherein the means for utilizing said signal comprise means for generating a second signal representative of a number that is proportional to the nominal value of the instantaneous angular position of the rotor, means for receiving the first-mentioned signal and developing a third signal representative of a number equal to the difference between the number represented by said first-mentioned signal and a number that is proportional to the nominal value of the angular velocity of the rotor, and means for forming from the sum of the second and third signals a fourth signal representative of a number that is proportional to the desired value of the instantaneous angular position of the rotor.

5. A control device according to claim 4, wherein each of said signals is a digital signal.

6. A control device for use with a stepping motor comprising a stator having phase winding means for generating a magnetic field which has a direction that can be varied with time in dependence on the current provided to the winding means for energization thereof, and a rotor having a plurality of alternating north and south magnetic poles about a peripheral region thereof, said poles being substantially equiangularly spaced about the axis of the rotor, said control device comprising means for generating first and second electrical voltages each varying in accordance with a sinusoidal function having a period proportional to the period of rotation of the rotor, the first and second voltages being in phase quadrature with each other, means for generating from said first and second voltages a signal representative of a number that is proportional to the square root of the sum of the squares of the first and second voltages, and means for utilizing said signal to modify the energizing current provided to the phase winding means.

7. A control device according to claim 6, wherein said means for generating said signal comprise means for generating first and second electrical currents proportional to the absolute values of the first and second voltages respectively, current mode means for forming a third current proportional to the sum of the squares of said first and second currents, and means for converting the third current into said signal.

8. A control device according to claim 7, wherein said signal is a digital signal and the means for converting the third current into said signal comprise means for converting the third current into a third voltage and an analog to digital converter for converting said third voltage into a digital signal representative of a number that is proportional to the value of the third voltage.

9. A control device according to claim 6, wherein the means for utilizing the said signal comprise means for generating a second signal representative of a number that is proportional to the nominal value of the instantaneous angular position of the rotor, means for receiving the first-mentioned signal and developing a third signal representative of a number equal to the difference between the number represented by said first-mentioned signal and a number that is proportional to the nominal value of the angular velocity of the rotor, and means for forming from the sum of the second and third signals a fourth signal representative of a number that is proportional to the desired value of the instantaneous angular position of the rotor.

10. A control device according to claim 9, wherein each of said signals is a digital signal.

11. A stepping motor comprising a stator having phase winding means for generating a magnetic field which has a direction that can be varied with time in dependence on the current provided to the winding means for energization thereof, a rotor having a plurality of alternating north and south magnetic poles about a peripheral region thereof, said poles being substantially equiangularly spaced about the axis of the rotor, means for generating first and second electrical voltages each varying in accordance with a sinusoidal function having a period proportional to the period of rotation of the rotor, the first and second voltages being in quadrature with each other, and a control device for generating from said first and second voltages a signal representative of a number that is proportional to the square root of the sum of the squares of the first and second voltages, and means for utilizing said signal to modify the energizing current provided to the phase winding means.

12. A stepping motor according to claim 11, wherein the rotor is in the form of a disc having 2N magnetic poles distributed about an annular region thereof, and the means for generating the first and second voltages comprise sense coils associated with the stator, whereby the period of the first and second voltages is equal to N times the period of rotation of the rotor.

* * * * *